Nov. 5, 1957 R. ADLER 2,812,431

RECEIVER A.F.C. SYSTEM USING A.C. AMPLIFICATION AND D.C. REINSERTION IN THE FEEDBACK LOOP

Filed Dec. 23, 1953 2 Sheets-Sheet 1

ROBERT ADLER
*INVENTOR.*

BY Francis W. Crotty

HIS ATTORNEY.

Nov. 5, 1957 R. ADLER 2,812,431

RECEIVER A.F.C. SYSTEM USING A.C AMPLIFICATION AND D.C. REINSERTION IN THE FEEDBACK LOOP

Filed Dec. 23, 1953 2 Sheets-Sheet 2

ROBERT ADLER
*INVENTOR.*

BY Francis W. Crotty

HIS ATTORNEY.

2,812,431
Patented Nov. 5, 1957

2,812,431

RECEIVER A. F. C. SYSTEM USING A. C. AMPLIFICATION AND D. C. REINSERTION IN THE FEEDBACK LOOP

Robert Adler, Northfield, Ill., assignor to Zenith Radio Corporation, a corporation of Illinois Application December 23, 1953, Serial No. 399,946

9 Claims. (Cl. 250—20)

This invention relates to wave-signal receivers and although it is applicable to both radio and television reception, it is of particular advantage in the television art and will be described more fully in that connection.

Conventional television receivers for receiving radio-frequency signals in the very-high-frequency (V. H. F.) and ultra-high-frequency (U. H. F.) bands are generally of the superheterodyne type and comprise a wave-signal receptor usually in the form of a directive antenna, commonly one or more stages of radio-frequency amplification, a heterodyning system which by mixing a locally generated signal and the received radio-frequency signal produces an intermediate-frequency wave containing the video intelligence of the received signal, several cascaded stages of intermediate-frequency amplification and a detector which produces video intelligence for display upon the viewing surface of an image-reproducing device.

Much of the manufacturing cost of present-day superheterodyne television receivers is attributable to the tuning structure which must be provided to permit selective reception on any of the twelve V. H. F. channels and/or the seventy U. H. F. channels presently allocated for television broadcasting. Moreover, for proper operation, the frequency of the local heterodyning oscillator must be accurately tuned simultaneously with the tuning of the radio-frequency preselecting circuits from channel to channel. There are in general use two types of tuning structures for achieving this accurate coincident tuning or tracking of the local oscillator and the preselecting circuits, namely, step-by-step turret tuners and continuous tuners. Step-by-step turret tuners require a large number of individual tuned circuits, at least two for each channel within the service band of the receiver, while continuous tuners must be held within strict manufacturing tolerances and require delicate adjustment to assure accurate tracking at all points within the tuning range. Moreover, additional wide-band tuned circuits are required in the intermediate-frequency amplifying stages, usually in the form of interstage coupling transformers, and these too are costly to construct and require individual adjustment.

It is a primary object of the invention to provide a new and improved wave-signal receiver in which one or more of the aforementioned disadvantages of prior art receivers is obviated.

It is a more specific object of the present invention to provide a wave-signal receiver in which the number of tuned circuits required for tuning is minimized, and in which tracking between the local oscillator and preselecting circuits is not required.

It is a further object of the present invention to provide an improved wave-signal receiver in which there are no stages of amplification required for intermediate-frequency signals.

A corollary object of the present invention is to provide a wave-signal receiver, and more especially a television receiver, which is simple in construction, economical in fabrication and efficient in performance.

The inventive concept of the present application is embodied in a wave-signal receiver comprising a source of wave-signals of the modulated-carrier type, including carrier-wave components of a predetermined frequency and intelligence-bearing modulation components within a predetermined frequency range that is small relative to the frequency of the carrier wave. In addition, a reference-signal source includes an oscillator system for generating a reference signal having a nominal frequency substantially equal to the carrier frequency. The receiver further comprises a pair of mixer devices each having a pair of input circuits and an output circuit, and each responsive to a pair of applied signals to develop an output signal corresponding to an intermodulation product of the applied input signals. Means coupling the reference-signal source and the modulated-carrier wave-signal source to corresponding input circuits of the mixer devices are provided to apply the modulated signal and the reference signal to different input circuits of each of the mixer devices. Phase-shifting means included in the coupling means is connected between one of the sources and one of the input circuits of one of the mixer devices for introducing a predetermined phase difference between the signal applied to that input circuit and the signal applied to the corresponding input circuit of the other mixer device, so that the relative amplitudes of the output signals of the pair of mixer devices vary in response to variations in the phase relations between the carrier-wave signal and the reference signal. A signal comparator circuit is coupled to the output circuits of the mixer devices for developing a first control signal indicative of the amplitude relation between the output signals. This control signal is applied to frequency-control means included in the oscillator system to stabilize the reference signal at the carrier frequency and at the optimum phase.

The features of the present invention which are believed to be novel are set forth with particularity in the appended claims. The invention, together with further objects and advantages thereof, may best be understood, however, by reference to the following description taken in connection with the accompanying drawings, in the several figures of which like reference numerals indicate like elements, and in which:

Figure 1:
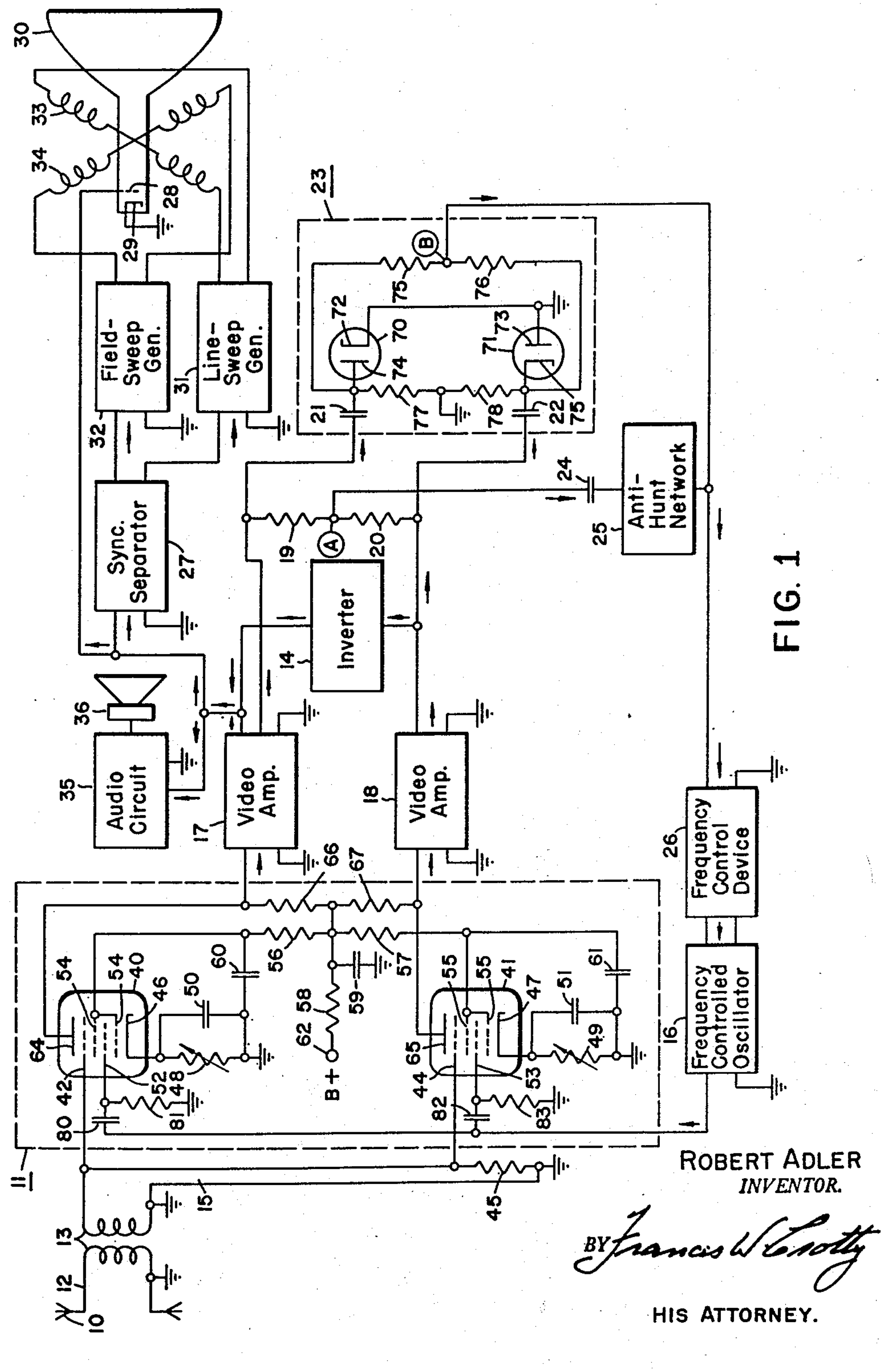
Figure 1 is a schematic diagram, partially in block form, of a television receiver constructed in accordance with the present invention.

In the receiver of Figure 1, which for convenience of explanation comprises only those elements required to receive television signals on a single channel, an antenna 10 is coupled to a mixer circuit 11, to be described hereinafter in greater detail, through a transmission line 12 which may be of the commonly employed 300-ohm balanced or twin lead type, a coupling transformer 13, and a phase-shifting means 15 which may comprise a section of transmission line corresponding to a quarter wavelength at the video carrier frequency of the television channel on which reception is to be effected. Phase-shifting means 15 is coupled between separate input circuits of mixer circuit 11 for providing a predetermined phase shift between the received signals as applied to the pair of input circuits of mixer 11. Reference signals of identical phase are applied to a second pair of input circuits of mixer 11 from a local oscillator 16 of any known construction capable of operating in the V. H. F. and/or U. H. F. frequency bands allocated to television transmission and adapted to automatic frequency control.

Mixer 11 is separately coupled to a pair of video amplifiers 17 and 18 individually comprising a plurality of cascade-connected amplifying stages of conventional construction and which preferably exhibit gain and bandwidth characteristics as nearly identical as conveniently possible; uniformity within the limits of ordinary manufacturing tolerances has been found to provide satisfactory results. Video amplifiers 17 and 18 are coupled to a balanced load circuit comprising a pair of resistors 19 and 20, and to a signal comparison circuit 23, hereinafter to be described in greater detail. Signal comparison circuit 23 and the junction A between resistors 19 and 20 are coupled to a frequency-control device 26 associated with reference-signal source or local oscillator 16. An anti-hunt network 25 which may comprise a simple resistance-capacitance network or any other circuit well known in the frequency control art is connected between junction A and frequency control device 26 for preventing transitory overcompensation of frequency control device 26. A blocking condenser 24 is connected between the junction of resistors 19 and 20 and anti-hunt network 25 to prevent any direct-current component in the output signal of video amplifiers 17 and 18 from affecting frequency control device 26.

Frequency-control means 26 may comprise a conventional reactance tube circuit coupled to local oscillator 16 or, if desired, the local oscillator may comprise an electron-discharge device provided with a control electrode whose bias voltage determines the operating frequency in a manner well known in the art, in which event the frequency-control means constitutes a portion of local oscillator 16.

Video amplifier 18 is coupled to a phase inverter 14, which may comprise a unity-gain triode amplifier or any other device capable of inverting the composite video signals generated in the output load circuit of video amplifier 18, and the inverted output signal from inverter 14 is combined with the output signal from video amplifier 17 and applied to a synchronizing signal separator 27, which separates the line-frequency and field-frequency synchronizing-signal components from the composite video signal. The combined composite video signal from video amplifier 17 and inverter 14 is also applied between the control electrode 28 and the cathode 29 of a cathode-ray tube or image-reproducing device 30. The line-frequency and field-frequency synchronizing-signal pulses from synchronizing-signal separator 27 are applied to line-frequency and field-frequency sweep-signal generators 31 and 32, respectively, and generators 31 and 32 are coupled to respective magnetic-deflection coils 33 and 34 associated with image-reproducing device 30.

To reproduce the audio portion of the received telecast, intercarrier sound signals may be derived from the combined output from video amplifier 17 and inverter 14 and applied through conventional audio detecting and amplifying circuits 35 to a loudspeaker or sound-reproducing device 36.

Local oscillator 16, video amplifiers 17 and 18, inverter 14, anti-hunt network 25, frequency-control device 26, synchronizing-signal separator 27, sweep generators 31 and 32, audio circuits 35, and image- and sound-reproducing devices 30 and 36 may each be of entirely conventional construction. Mixer 11 and signal comparison circuit 23, however, are of unconventional construction and will now be described in detail.

Mixer circuit 11 comprises a pair of electron-discharge devices 40 and 41 which may be of the conventional gated-beam type, as for example that designated 6BN6. The secondary winding of input coupling transformer 13 is directly coupled to the second control grid 42 of electron-discharge device 40. The secondary winding of coupling transformer 13 is also coupled through relay line 15 to the second control grid 44 of electron-discharge device 41, and grids 42 and 44 are returned to ground through resistor 45 of a resistance corresponding to the characteristic impedance of delay line 15, to prevent undesirable reflections in the line. The cathodes 46 and 47 of electron-discharge devices 40 and 41, respectively, are connected to ground through variable resistors 48 and 49 by-passed for radio frequencies by condensers 50 and 51. Frequency-controlled oscillator 16 is coupled to the first control grid 52 of electron-discharge device 40 through a coupling network consisting of a condenser 80 and a grid-leak resistor 81, and to the first control grid 53 of electron-discharge device 41 through a coupling condenser 82 which is connected to ground through a grid-leak resistor 83.

The accelerating electrodes 54 and 55 of electron-discharge devices 40 and 41 are coupled to the positive terminal 62 of a suitable source of unidirectional operating potential, conventionally designated B+, through respective resistors 56 and 57 and through a common decoupling resistor 58, and resistor 58 is by-passed to ground for radio frequencies by a condenser 59. Resistors 56 and 57 are separately by-passed to ground through respective condensers 60 and 61.

The anodes or output electrodes 64 and 65 of electron-discharge devices 40 and 41 are respectively coupled to the positive terminal 62 of operating potential source B+ through respective balanced load resistors 66 and 67 and through common decoupling resistor 58. Anode 64 is coupled to video amplifier 17 while anode 65 is coupled to video amplifier 18.

Signal comparison circuit 23 comprises a pair of electron-discharge devices 70 and 71, preferably a pair of conventional diodes such as in the type 6AL5 vacuum tube, each having a cathode and an anode. The cathode 72 of electron-discharge device 70 and the anode 73 of device 71 are connected directly to ground. The anode 74 of device 70 is coupled to the output of video amplifier 17 through a coupling condenser 21, and the cathode 75 of device 71 is coupled to the output of video amplifier 18 through a coupling condenser 22. Anode 74 of device 70 is connected to cathode 75 of device 71 through a pair of series-connected balanced resistors 75 and 76, and the junction B between resistors 75 and 76 is coupled directly to frequency-control device 26. Anode 74 and cathode 75 are also connected to ground through balanced resistors 77 and 78, respectively.

Before proceeding with a detailed discussion of the operation of the receiver of Figure 1, it is desirable to consider the more general aspects of the operation and the manner in which it differs from that of conventional superheterodyne circuits. An incoming composite television signal, modulated on an appropriate radio-frequency carrier wave, is intercepted by antenna 10 and applied through input transformer 13 to one of the input circuits of mixer device 40. At the same time, the same signal, shifted in phase by about 90 electrical degrees by means of delay line 15, is applied to the corresponding input circuit of mixer device 41. Simultaneously, a reference signal, corresponding in frequency to the carrier frequency of the incoming composite television signal, is applied in like phase to the remaining input circuits of mixer devices 40 and 41. Since the frequency of the reference signal is stabilized at the carrier frequency of the composite television signal the modulation components, representing the picture intelligence, are developed across balanced output circuit 66, 67. The composite video signals from devices 40 and 41 are applied in opposite phase through video amplifiers 17 and 18 to the control signal generating system comprising load resistors 19 and 20, anti-hunt network 25 and signal comparison circuit 23. The control signal generating system functions, in a manner to be described in detail later, to lock oscillator 16 to the picture carrier of the received signal.

The amplified composite video signal from video amplifier 18 is inverted in phase by device 14 and combined with the output signal from video amplifier 17. The combined composite video signals are applied to the control elements of image-reproducing device 30 to intensity modulate the electron beam, and the synchronizing components are separated from the video-signal components by separator 27 and employed to drive the line-frequency and field-frequency generators 31 and 32 to control the scansion of the electron beam. In this manner, the image intelligence is reconstituted on the viewing screen of reproducing device 30. Inter-carrier sound signals are derived from the combined output of video amplifier 17 and inverter 14 in a manner well known to the art and are demodulated and amplified in audio circuits 35 to provide an audio signal, representative of the transmitted sound intelligence, for application to loudspeaker 36. If desired, inverter 14 may be omitted and the audio, video, and synchronizing components may be derived from either of video amplifiers 17 and 18, although this may result in some sacrifice in performance.

Thus, the receiver of Figure 1 differs from conventional superheterodyne receivers in that the composite video signal is derived directly from the received radio-frequency signal through a process of zero-beat detection. The second channel of video amplification and the signal comparison circuit are provided in order to stabilize the frequency of the local oscillator or reference-signal generator.

In disclosing a more rigorous explanation of the operation of the receiver, a condition will first be assumed in which the frequencies of the reference signal from oscillator 16 and the carrier-wave component of the received television signal are equal but in which the reference signal is displaced in phase 90 electrical degrees from a position midway between the respective radio-frequency input signals applied to mixer devices 40 and 41. The significance of the phase relationships between the reference frequency signal and the carrier wave signals is considered in the discussion of the graphical representations of Figure 2. For convenience, this condition is hereinafter referred to as a synchronous condition or a condition of synchronous operation.

The received television signal includes modulation components within a predetermined frequency range that is small relative to the carrier frequency and is applied to control electrodes 42 and 44 of electron-discharge devices 40 and 41 in substantial phase quadrature due to phase-shifting means 15. At the same time, the reference signal is applied in like phase to control grids 52 and 53 of these mixers. For this condition, the output signals from mixer devices 40 and 41, developed across resistors 66 and 67 respectively, are equal in amplitude but of opposite polarity. Since video amplifiers 17 and 18 have substantially identical gain and frequency response characteristics, the signals developed across load resistors 19 and 20 are also of equal amplitude and opposite polarity, and the alternating-current components are balanced with respect to the junction A of resistors 19 and 20. Hence no A. C. control signal is developed at point A for application to frequency-control device 26 through anti-hunt network 25.

The balanced output signals from video amplifiers 17 and 18 are also applied to signal comparison circuit 23, where they are separately rectified by diodes 70 and 71 which act as peak rectifiers in a manner well known in the art. Because the positive excursion of the signal applied to anode 74 of diode 70 is equal in magnitude to the negative excursion of the signal applied to cathode 75 of diode 71, equal anode-to-cathode currents flow in each tube. Since resistors 77 and 78 are equal, the rectified voltages developed across balanced resistors 75 and 76 are of equal magnitude and opposite polarity. Consequently, no direct current control signal is developed at junction B between resistors 75 and 76 for application to frequency-control device 26. Consequently, when the reference signal from local oscillator 16 is in frequency synchronism and phase balance with the carrier-frequency component of the input signal, there is no control voltage developed at the input of frequency control device 26 to affect the frequency of the reference signal.

If for any reason the described condition of synchronous operation is disturbed, an unbalance arises in the output of mixer 11 which results in the generation of a control signal indicative of the magnitude and sense of the deviation from synchronous operation. This control signal is applied to frequency-control device 26 to effect a shift in the operating frequency of oscillator 16 to an extent and in a direction to restore synchronous operation. More specifically, if the phase of the reference signal instantaneously lags that required for synchronous operation, the voltage output of mixer tube 40 exceeds in scalar value the voltage output of mixer tube 41. At point A there appears an unbalanced A. C. voltage which is applied to frequency-control device 26. At the same time, diode 70 of the signal comparison circuit is more conductive than diode 71, resulting in a flow of current through resistor 77 greater than that through resistor 78; therefore an unbalanced D. C. voltage is developed at point B. The unbalanced A. C. potential at the output of anti-hunt network 25 and the unbalanced negative D. C. potential at point B are combined to form a control signal for application to frequency-control device 26 to increase the frequency of oscillator 16 and re-establish the phasing of the reference signal to restore synchronous operation.

Conversely, if the phase of the reference signal instantaneously leads that required for synchronous operation, control signal components of opposite polarity are generated at points A and B and are applied to frequency-control device 26 to restore the condition of synchronous operation.

Frequency changes in the reference signal in response to the control of device 26 are often unavoidably accompanied by small amplitude variations of the reference signal. These amplitude variations must be rejected by mixer 11 in order to avoid instability such as parasitic oscillation of the frequency control system. Cathode resistors 48 and 49 are made variable to permit adjustment of the operating point of mixer devices 40 and 41 so that amplitude variations of the reference signal do not produce corresponding output voltages across load resistors 66 and 67. A gated-beam tube, such as the 6BN6, exhibits a transfer characteristic of the step-function type and therefore operates as a limiter; the adjustment of rheostats 48 and 49 in conjunction with the operating characteristics of these tubes minimizes the output voltage components resulting from amplitude variations of the reference signal.

Figure 2:
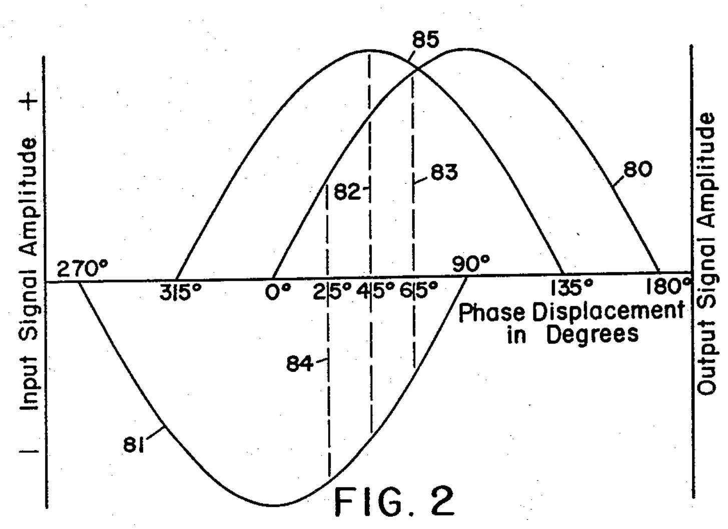
Figure 2 is a graphical representation useful in explaining the operation of the receiver shown schematically in Figure 1.

Reference is now made to the graphical representation of Figure 2 which for the moment may be considered to depict only individual half-cycles of the reference signal and of the carrier-frequency components of the input signals applied to control grids 42 and 44 of mixer devices 40 and 41. The input signal applied to control electrode 42 is represented by the fragmentary sine wave 80. The input signal 81 simultaneously applied to control electrode 44 is delayed in phase by about 90 electrical degrees, due to quarter-wave delay line 15. The reference frequency signal from oscillator 16, represented by fragmentary sine wave 85, must be so phased in relation to the carrier-wave signals applied to the inputs of mixer devices 40 and 41 that it passes through its maximum amplitude at the instant when these input signals are equal and of opposite polarity. The positive and negative excursions of the applied sine-wave signals 80 and 81 may be assumed to be equal during any operating interval of the duration depicted (less than one complete cycle at the carrier frequency), since the carrier frequency is many times higher than the highest modulation-component frequency. In the condition of synchronous operation, when the reference signal is equal in frequency to the carrier frequency of the received wave and is phased 90 degrees from a phase position midway between the quadrature-phased input signals to mixer devices 40 and 41, zero-beat detection of the modulation components is achieved and balanced composite video signals are developed across load resistors 66 and 67.

As indicated by the ordinate scale at the right-hand side of the figure, curves 80 and 81 may also be considered as a graphical representation of the output voltages developed across resistors 19 and 20, respectively, as functions of the phase displacement between the actual phase of the reference signal from local oscillator 16 and that required for a condition of synchronous operation. In the synchronous operating condition, when the reference signal is equal in frequency to the carrier frequency of the received television signal and is phased 90 degrees from a phase position midway between the quadrature-phased input signals to mixer devices 40 and 41, the output voltages developed by video amplifiers 17 and 18 are equal in magnitude but of opposite polarity, as indicated by dashed line 82. The D. C. voltages developed by diodes 70 and 71 of signal comparison circuit 23 are of equal amplitude and cancel at point B because of their opposite polarity. In view of the symmetry of the circuit arrangement no significant voltage appears at point A. Thus, the operating condition of frequency-control device 26 is unaltered, and the receiver continues to operate synchronously.

If the phase of the reference signal lags that required for synchronous operation, the amplitude of the voltage developed across resistor 19 is greater than the output voltage developed across resistor 20, as indicated by dashed line 83. The negative voltage developed by diode 70 exceeds the positive voltage developed by diode 71 and as a consequence, a signal of negative polarity appears at point B and is applied directly to frequency-control device 26. The negative control potential increases the frequency of oscillator 16 to restore the system to equilibrium.

Conversely, if the phase of the reference signal developed by oscillator 16 instantaneously leads that required for synchronous operation, the magnitude of the positive voltage generated by diode 71 exceeds the negative voltage developed by diode 70. As a consequence of the control voltage applied to frequency-control device 26, the frequency of reference oscillator 16 decreases and equilibrium is restored to the system.

From another viewpoint, signal comparison circuit 23 restores, or reinserts, the D. C. components lost in the video amplifiers in order to provide the necessary D. C. control voltage to keep the reference signal locked in the proper phase. At the same time, a voltage corresponding to the instantaneous arithmetical mean of the output voltages of video amplifiers 17 and 18 is developed at point A and applied to frequency-control device 26 through coupling condenser 24 and anti-hunt network 25. In effect, the alternating voltage developed at point A corrects for rapid transient disturbances of the system and more especially insures pull-in when frequency-controlled oscillator 16 is tuned in the vicinity of the applied carrier-wave signal. The structural elements comprising resistors 19 and 20, coupling condenser 24 and anti-hunt network 25 function in a manner analogous to known anti-hunt or damping networks incorporated in conventional automatic frequency control systems.

Although in the preferred embodiment the received signal is applied to mixer devices 40 and 41 in phase quadrature, the invention is operable with any phase displacement other than an integral multiple of 180 electrical degrees between the input signals to the mixer devices. Figure 2 demonstrates that for proper operation the phase displacement between the modulated radio-frequency input signals applied to mixer devices 40 and 41 may be shifted from the optimum value illustrated to any phase displacement other than an integral multiple of 180 electrical degrees. If the modulated radio-frequency input signals were displaced by a phase angle of an integral multiple of 180 electrical degrees, they would be in either phase coincidence or phase opposition, in which case no possible phase displacement of the reference signal in relation to the input signals could result in output signals of unequal amplitudes from mixer devices 40 and 41. For that condition there is no control exercised by frequency device 26 and the phase conditions required by the zero-beat detectors may be lost.

As an alternative structural arrangement, phase inverter 14 may be placed between the output of video amplifier 18 and the junction of resistor 20 and condenser 22. In such an arrangement, because of the 180 degree phase reversal of the output signal from video amplifier 18, the reference signal phase must be midway between the quadrature-phased input signals. In this embodiment, video signals are taken directly from the outputs of the video amplifiers and combined for application to reproducer 30.

Figure 3:
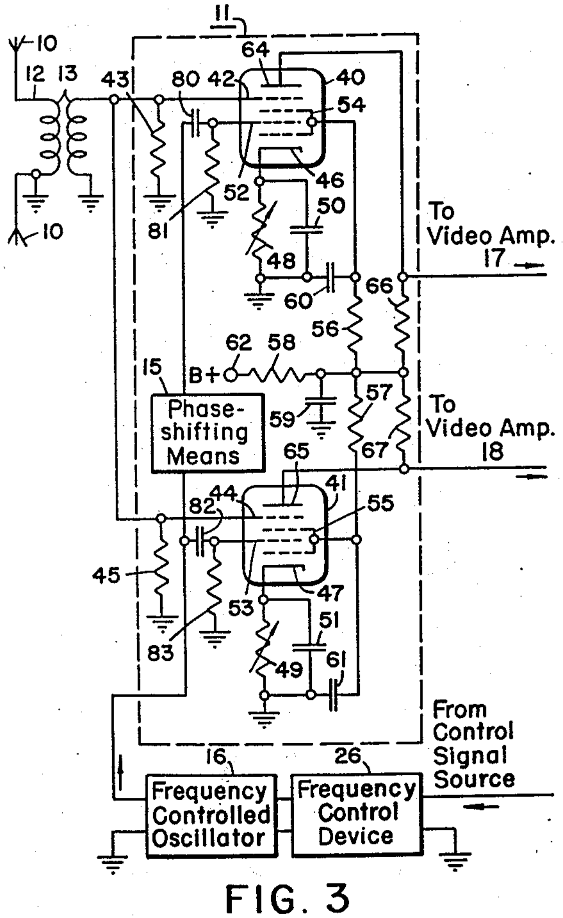
Figures 3 and 4 are partial schematic diagrams of other embodiments of the present invention.

As illustrated in the fragmentary view of Figure 3 the phase-shift network may be inserted between input electrodes 52 and 53 of the electron-discharge devices of mixer 11 so that the reference signal from oscillator 16 is applied thereto in phase quadrature. In that event the received television signal is applied in like phase to control grids 42 and 44. If desired, phase-shift networks or delay lines may be inserted in both the modulated-signal and the reference-signal input circuits, but the total effective phase difference between the input signals to mixer device 11 must not equal an integral multiple of 180 electrical degrees.

Figure 4:
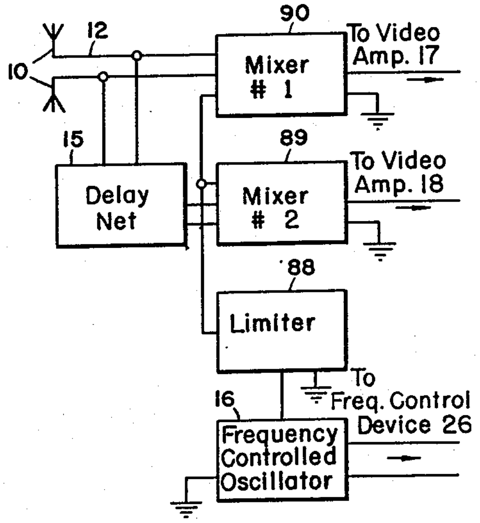

While variable cathode resistors 48 and 49 of mixer devices 40 and 41 may be conveniently used in conjunction with the limiting characteristic of the gated beam tube for inhibiting the deleterious effects of incidental amplitude variations arising in frequency controlled oscillator 16, separate limiters or other known circuit arrangements may be employed. If separate limiters or the like are used for AM rejection, the gated beam tube converters may be replaced by other conventional converters such as pentode or balanced diode arrangements. This arrangement is illustrated in the fragmentary view of Figure 4 wherein a limiter circuit 88 of any conventional design well known in the art is coupled between the output of frequency controlled oscillator 16 and the separate inputs of mixers 89 and 90. For convenience, in this representation mixer circuit 11 is illustrated in block diagram form as separate mixer devices 89 and 90. In this adaptation, limiter 88 suppresses the effect of unwanted amplitude variations in the reference signal arising through frequency changes introduced by frequency control device 26.

In the discussion of the receiver thus far, consideration has been given only to the reception of a single television channel but all of the embodiments are useful for multi-channel operation. It will be recognized that phase-shifting means 15 may operate over a wide band of frequencies and may provide the necessary relative phase of the input signal to grids 42 and 44 of mixer devices 40 and 41, within the aforementioned operating limits of phase variations, for several television channels. To selectively receive any one of those channels, it is only necessary that oscillator 16 be adjustable over a frequency band such that it may effect zero-beat detection of the selected signal channel through the instrumentality of mixer circuit 11. In order to avoid inter-channel interaction within the receiver it is preferable that the reference oscillator develop a signal that is a pure sine wave or exceedingly low in harmonic content.

In order to cover the multiplicity of channels available in the V. H. F. and U. H. F. television range it is, of course, desirable that the reference oscillator be tunable over a corresponding band of frequencies, and it may be necessary to employ more than one phase-shifting delay line because the frequency characteristics of a single line may not suffice for the entire range of frequencies on which television channels may be received. Since a single line may, nevertheless, serve for several channels, only a small number of such lines are required to cover the entire television spectrum. Where several such lines are employed, they may be functionally connected in the input to mixer 11 by any known switching device and in each case reference oscillator 16 is tuned to select a particular desired channel. But the tuning requirements of the reference oscillator are far less stringent than the precision dictated to effect tracking in superheterodyne reception of the television signals.

In summary, the present invention provides a novel wave-signal receiving system which avoids the necessity of employing stages of intermediate-frequency amplification with their attendant tuned coupling circuits. The tuning of this receiver to various channels in either the V. H. F. or U. H. F. bands of television signal transmission is simplified because the frequency of the frequency-controlled reference oscillator need only be adjusted to approximately the frequency of the carrier wave of the received television signal. Moreover, because of the stabilizing action of the frequency-control system the tuning of the oscillator is not particularly critical since the feedback network applies a signal which locks the oscillator for synchronous operation. There is no close tolerance required in the construction of the phase-shift delay line. It is, therefore, simple and economical to manufacture. The more complex tuning structures and the requirement for accurate tracking between resonant circuits of the local oscillator and the radio-frequency tuned circuits of conventional television receivers are thus eliminated by this invention.

While particular embodiments of the invention have been shown and described, modifications may be made, and it is intended in the appended claims to cover all such modifications as fall within the true spirit and scope of the invention.

I claim:

1. A wave-signal receiver comprising: a source of a modulated carrier-wave signal including a carrier component of a predetermined frequency and modulation components within a predetermined frequency range small relative to said carrier frequency; a source including an oscillator for generating a reference signal having a nominal frequency substantially equal to said carrier frequency; a pair of mixer devices each having input electrodes and output electrodes and each responsive to a pair of applied input signals to develop an output signal corresponding to an intermodulation product of said applied input signals; means coupling each of said sources to corresponding input electrodes of said mixer devices to apply said reference signal and said modulated signal to said mixer devices, said coupling means including phase-shifting means connected between one of said sources and one of said mixer devices for introducing a predetermined phase difference between the signal applied to said one device and that applied to the other of said mixer devices, whereby the relative amplitudes of the output signals of said mixer devices vary in response to variations in the phase relations between said modulated carrier-wave signal and said reference signal; means including a pair of amplifiers respectively coupled to said output electrodes of said mixer devices for translating alternating signal components, corresponding to said modulation components, appearing at said output electrodes while suppressing the D. C. components of said output signals which include spurious components as well as additional components corresponding to said carrier; D. C. restoring means coupled to said amplifiers for deriving from said alternating signal components a D. C. control signal corresponding to a combination of said suppressed additional D. C. components of said output signals; frequency-control means for varying the operating frequency of said reference oscillator; and means for applying said control signal to said frequency-control means for stabilizing the phase and frequency of said reference signal relative to the carrier component of said modulated signal.

2. A wave-signal receiver comprising: a source of a modulated carrier-wave signal including a carrier component of a predetermined frequency and modulation components within a predetermined frequency range small relative to said carrier frequency; a source including an oscillator for generating a reference signal having a nominal frequency substantially equal to said carrier frequency; a pair of mixer devices each having input electrodes and output electrodes and each responsive to a pair of applied input signals to develop an output signal corresponding to an intermodulation product of said applied input signals; means coupling each of said sources to corresponding input electrodes of said mixer devices to apply said reference signal and said modulated signal to said mixer devices, said coupling means including phase-shifting means connected between one of said sources and one of said mixer devices for introducing a predetermined phase difference between the signal applied to said one input circuit and that applied to the other of said mixer devices, whereby the relative amplitudes of the output signals of said mixer devices vary in response to variations in the phase relations between said modulated carrier-wave signal and said reference signal; means including a pair of amplifiers respectively coupled to said output electrodes of said mixer devices for translating alternating signal components, corresponding to said modulation components, appearing at said output electrodes while suppressing the D.-C. components of said output signals which include spurious components as well as additional components corresponding to said carrier; D.-C. restoring means coupled to said amplifiers for deriving from said alternating signal components a D.-C. control signal corresponding to a combination of said suppressed additional D.-C. components of current control signal indicative of the amplitude relation between said output signals; means coupled to said output electrodes of said mixer devices for developing an alternating-current control signal corresponding to the difference between the alternating signal components of said output signals; frequency-control means for varying the operating frequency of said reference oscillator; and means for applying said control signals to said frequency-control means for stabilizing the phase and frequency of said reference signal relative to the carrier component of said modulated signal.

3. A wave-signal receiver comprising: a source of a modulated carrier-wave signal including a carrier component of a predetermined frequency and modulation components within a predetermined frequency range small relative to said carrier frequency; a source including an oscillator for generating a reference signal having a nominal frequency substantially equal to said carrier frequency; a mixer circuit comprising a pair of multi-electrode electron-discharge devices each having a first input electrode, a second input electrode and output electrodes to develop an output signal corresponding to an intermodulation product of said applied input signals; means coupling each of said sources to corresponding input electrodes of said electron-discharge devices to apply said reference signal and said modulated signal to different input electrodes of each of said electron-discharge devices, said coupling means including phase-shifting means connected between one of said sources and one of said input electrodes of one of said electron discharge devices for introducing a predetermined phase difference between the signal applied to said one input electrode and that applied to the corresponding input electrode of the other of said electron-discharge devices, whereby the relative amplitudes of the output signals of said pair of electron-discharge devices vary in response to variations in the phase relations between said modulated carrier-wave signal and said reference signal; means including a pair of amplifiers respectively coupled to said output electrodes of said electron-discharge devices for translating alternating signal components, corresponding to said modulation components, appearing at said output electrodes while suppressing the D.-C. components of said output signals which include spurious components as well as additional components corresponding to said carrier; D.-C. restoring means coupled to said amplifiers for deriving from said alternating signal components a D.-C. control signal corresponding to a combination of said suppressed additional D.-C. components of said output signals; frequency-control means for varying the operating frequency of said reference oscillator; and means for applying said control signal to said frequency-control means for stabilizing the phase and frequency of said reference signal relative to said carrier component of said modulated signal.

4. A wave-signal receiver comprising: a source of a modulated carrier-wave signal including a carrier component of a predetermined frequency and modulation components within a predetermined frequency range small relative to said carrier frequency; a source including an oscillator for generating a reference signal having a nominal frequency substantially equal to said carrier frequency; a pair of mixer devices each having input electrodes and output electrodes and each responsive to a pair of applied input signals to develop an output signal corresponding to an intermodulation product of said applied input signals; means coupled to said modulated-signal source and including phase-shifting means for applying said modulated signals in predetermined different phase to said input electrodes of each of said mixer devices; means coupled to said oscillator for applying said reference signal in like phase to input electrodes of said mixer devices whereby the relative amplitudes of the output signals of said pair of mixer devices vary in response to variations in the phase relations between said modulated carrier wave signal and said reference signal; means including a pair of amplifiers respectively coupled to said output electrodes of said mixer devices for translating alternating signal components, corresponding to said modulation components, appearing at said output electrodes while suppressing the D.-C. components of said output signals which include spurious components as well as additional components corresponding to said carrier; D.-C. restoring means coupled to said amplifiers for deriving from said alternating signal components a D.-C. control signal corresponding to a combination of said suppressed additional D.-C. components of said output signals; frequency-control means for varying the operating frequency of said reference oscillator; and means for applying said control signal to said frequency-control means for stabilizing the phase and frequency of said reference signal relative to said carrier component of said modulated signal.

5. A wave-signal receiver comprising: a source of a modulated carrier-wave signal including a carrier component of a predetermined frequency and modulation components within a predetermined frequency range small relative to said carrier frequency; a source including an oscillator for generating a reference signal having a nominal frequency substantially equal to said carrier frequency; a pair of mixer devices each having input electrodes and output electrodes and each responsive to a pair of applied input signals to develop an output signal corresponding to an intermodulation product of said applied input signals; means coupled to said oscillator system and including phase-shifting means for applying said reference signal in predetermined different phase to input electrodes of each of said mixer devices; means coupled to said modulated signal source for applying said modulated signals in like phase to input electrodes of each of said mixer devices, whereby the relative amplitudes of the output signals of said mixer devices vary in response to variations in the phase relations between said modulated-carrier-wave signal and said reference signal; means including a pair of amplifiers respectively coupled to said output electrodes of said mixer devices for translating alternating signal components, corresponding to said modulation components, appearing at said output electrodes while suppressing the D.-C. components of said output signals which include spurious components as well as additional components corresponding to said carrier; D.-C. restoring means coupled to said amplifiers for deriving from said alternating signal components a D.-C. control signal corresponding to a combination of said suppressed additional D.-C. components of said output signals; means coupled to said output electrodes of said mixer devices for developing an alternating-current control signal corresponding to the difference between the alternating signal components of said output signals; frequency-control means for varying the operating frequency of said reference oscillator; and means for applying said control signals to said frequency-control means for stabilizing the phase and frequency of said reference signal relative to said carrier component of said modulated signal.

6. A wave-signal receiver comprising: a source of a modulated carrier-wave signal including a carrier component of a predetermined frequency and modulation components within a predetermined frequency range small relative to said carrier frequency; a source including an oscillator for generating a reference signal having a nominal frequency substantially equal to said carrier frequency; a pair of mixer devices each having input electrodes and output electrodes and each responsive to a pair of applied input signals to develop an output signal corresponding to an intermodulation product of said applied input signals; means coupling each of said sources to corresponding input electrodes of said mixer devices to apply said reference signal and said modulated signal to said mixer devices, said coupling means including a delay network connected between one of said sources and one of said mixer devices for introducing a predetermined phase difference between the signal applied to said one device and that applied to the other of said mixer devices, whereby the relative amplitudes of the output signals of said pair of mixer devices vary in response to variations in the phase relations between said modulated carrier-wave signals and said reference signal; means including a pair of amplifiers respectively coupled to said output electrodes of said mixer devices for translating alternating signal components, corresponding to said modulation components, appearing at said output electrodes while suppressing the D.-C. components of said output signals which include spurious components as well as additional components corresponding to said carrier; D.-C. restoring means coupled to said amplifiers for deriving from said alternating signal components a D.-C. control signal corresponding to a combination of said suppressed additional D.-C. components of said output signals; frequency-control means for varying the operating frequency of said reference oscillator; and means for applying said control signal to said frequency-control means for stabilizing the phase and frequency of said reference signal relative to said carrier components of said modulated signal.

7. A wave-signal receiver comprising: a source of a modulated carrier-wave signal including a carrier component of a predetermined frequency and modulation components within a predetermined frequency range small relative to said carrier frequency; a source including an oscillator for generating a reference signal having a nominal frequency substantially equal to said carrier frequency; a pair of mixer devices each having input electrodes and output electrodes and each responsive to a pair of applied input signals to develop an output signal corresponding to an intermodulation product of said applied input signals; means coupling each of said sources to corresponding input electrodes of said mixer devices to apply said reference signal and said modulated signal to said mixer devices, said coupling means including phase-shifting means connected between one of said sources and one of said mixer devices for introducing a predetermined phase difference between the signal applied to said one device and that applied to the other of said mixer devices, whereby the relative amplitudes of the output signals of said mixer devices vary in response to variations in the phase relations between said modulated carrier-wave signals and said reference signal; means including a pair of amplifiers respectively coupled to said output electrodes of said mixer devices for translating alternating signal components, corresponding to said modulation components, appearing at said output electrodes while suppressing the D.-C. components of said output signals which include spurious components as well as additional components corresponding to said carrier; D.-C. restoring means coupled to said amplifiers for deriving from said alternating signal components a D.-C. control signal corresponding to a combination of said suppressed additional D.-C. components of said output signals; means coupled to the output electrodes of said mixer devices for developing an alternating current control signal corresponding to the difference between the alternating signal components of said output signals; frequency-control means for varying the operating frequency of said reference oscillator; and means for combining said control signals to develop a composite control signal and for applying said composite control signal to said frequency-control means for stabilizing the phase and frequency of said reference signal relative to said carrier component of said modulated signal.

8. A wave-signal receiver comprising: a source of a modulated carrier-wave signal including a carrier component of a predetermined frequency and modulation components within a predetermined frequency range small relative to said carrier frequency; a source including an oscillator for generating a reference signal having a nominal frequency substantially equal to said carrier frequency; a pair of mixer devices each having input electrodes and output electrodes and each responsive to a pair of applied input signals to develop an output signal corresponding to an intermodulation product of said applied input signals; means coupling each of said sources to corresponding input electrodes of said mixer devices to apply said reference signal and said modulated signal to said mixer devices, said coupling means including phase-shifting means connected between one of said sources and one of said mixer devices for introducing a predetermined phase difference between the signal applied to said one device and that applied to other of said mixer devices, whereby the relative amplitudes of the output signals of said pair of mixer devices vary in response to variations in the phase relations between said modulated carrier-wave signal and said reference signal; means for suppressing the effect of amplitude variations of said reference signal upon said mixer output signals; means including a pair of amplifiers respectively coupled to said output electrodes of said mixer devices for translating alternating signal components, corresponding to said modulation components, appearing at said output electrodes while suppressing the D.-C. components of said output signals which include spurious components as well as additional components corresponding to said carrier; D.-C. restoring means coupled to said amplifiers for deriving from said alternating signal components a D.-C. control signal corresponding to a combination of said suppressed additional D.-C. components of said output signals; frequency-control means included in said oscillator system for varying the operating frequency of said reference oscillator; and means for applying said control signal to said frequency-control means for stabilizing the phase and frequency of said reference signal relative to said carrier component of said modulated signal.

9. A wave-signal receiver comprising: a source of a modulated carrier-wave signal including a carrier component of a predetermined frequency and modulation components within a predetermined frequency range small relative to said carrier frequency; a source including an oscillator for generating a reference signal having a nominal frequency substantially equal to said carrier frequency; a pair of mixer devices each having input electrodes and output electrodes and each responsive to a pair of applied input signals to develop an output signal corresponding to an intermodulation product of said applied input signals; means coupled to said modulated signal source for applying said modulated signals in predetermined difference phase to the input electrodes of each of said mixer devices; amplitude-limiting means coupled to said oscillator system for applying said reference signal in like phase to each of said mixer devices whereby the relative amplitudes of the output signals of said pair of mixer devices vary in response to variations in the phase relations between said modulated carrier-wave signals and said reference signal; means including a pair of amplifiers respectively coupled to said output electrodes of said mixer devices for translating alternating signal components, corresponding to said modulation components, appearing at said output electrodes while suppressing the D.-C. components of said output signals which include spurious components as well as additional components corresponding to said carrier; D.-C. restoring means coupled to said amplifiers for deriving from said alternating signal components a D.-C. control signal corresponding to a combination of said suppressed additional D.-C. components of said output signals; means coupled to said amplifiers for developing an alternating-current control signal corresponding to the difference between said output signals; frequency-control means for varying the operating frequency of said reference oscillator; and means for applying said control signals to said frequency-control means for stabilizing the phase and frequency of said reference signal relative to said carrier component of said modulated signal.

References Cited in the file of this patent

UNITED STATES PATENTS

| | | |
|---|---|---|
| 2,018,820 | Usselman | Oct. 29, 1935 |
| 2,041,855 | Ohl | May 26, 1936 |
| 2,065,565 | Crosby | Dec. 29, 1936 |
| 2,104,801 | Hansell | Jan. 11, 1938 |
| 2,243,141 | Weagant | May 27, 1941 |
| 2,273,023 | De Bellescize | Feb. 17, 1942 |
| 2,540,333 | Hugenholtz | Feb. 6, 1951 |
| 2,664,464 | Cotsworth | Dec. 29, 1953 |